United States Patent
Sella et al.

(10) Patent No.: US 8,989,199 B1
(45) Date of Patent: Mar. 24, 2015

(54) CONTROL DEVICE DISCOVERY IN NETWORKS HAVING SEPARATE CONTROL AND FORWARDING DEVICES

(71) Applicant: Level 3 Communications, LLC, Broomfield, CO (US)

(72) Inventors: William Thomas Sella, Parker, CO (US); James Michael Sella, Parker, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 14/188,027

(22) Filed: Feb. 24, 2014

(51) Int. Cl.
  *H04L 12/28* (2006.01)
  *H04L 12/717* (2013.01)
  *H04L 12/751* (2013.01)

(52) U.S. Cl.
  CPC .............. *H04L 45/42* (2013.01); *H04L 45/02* (2013.01)
  USPC .. 370/409; 370/397; 370/395.31; 370/395.53

(58) Field of Classification Search
  None
  See application file for complete search history.

(56) References Cited

U.S. PATENT DOCUMENTS

| | | | |
|---|---|---|---|
| 8,787,388 B1 * | 7/2014 | Adams et al. | 370/395.31 |
| 2011/0261723 A1 * | 10/2011 | Yamato et al. | 370/255 |
| 2011/0317701 A1 * | 12/2011 | Yamato et al. | 370/392 |
| 2013/0034104 A1 * | 2/2013 | Yedavalli et al. | 370/400 |
| 2013/0077481 A1 * | 3/2013 | Philavong et al. | 370/228 |
| 2013/0148667 A1 * | 6/2013 | Hama et al. | 370/400 |
| 2013/0194914 A1 * | 8/2013 | Agarwal et al. | 370/225 |
| 2014/0307742 A1 * | 10/2014 | Koide | 370/400 |

FOREIGN PATENT DOCUMENTS

WO    WO 2012081202 A1 *    6/2012

* cited by examiner

*Primary Examiner* — Andrew Chriss
*Assistant Examiner* — Joshua A Kading

(57) ABSTRACT

A Software Defined Network (SDN) includes a plurality of forwarding devices and a routing control device located separate from the forwarding devices. The routing control device, establishes paths to and from the network forwarding devices. Using such paths, forwarding devices send the routing control device information reflecting the topology if the network. Embodiments disclosed herein enable automatic discovery of the topology of the network and the paths to and from the routing control device.

21 Claims, 7 Drawing Sheets

CONTROL DEVICE DISCOVERY IN NETWORKS HAVING SEPARATE CONTROL AND FORWARDING DEVICES

BACKGROUND

1. Field

This field is generally related to network routing.

2. Related Art

A communication network may, for example, provide a network connection that allows data to be transferred between two geographically remote locations. A network connection may span multiple links connecting communication devices such as routers. Networks may have different topologies depending on how the links are interconnected through communication devices. Given a particular network topology, multiple routes may be available between a source and destination. Some routes may be more desirable than others depending on current capacity and usage.

Traditional routing algorithms rely on local information each router has from its neighboring links and devices to route data. A router maintains such information in a routing table. And based on the destination address of an incoming packet, a router uses its routing table to forward the packet to a specific neighboring device. To develop the routing table, each router uses a protocol like Border Gate Protocol (BGP) to exchange routing and reachability information with local neighboring routers. In this way, each router both forwards packets and conducts control functions to update its own routing table.

While using local information may be desirable in some contexts, it may not always route data efficiently. To route data more efficiently, another technique, referred to as Software Defined Networks (SDNs), separates the control and forwarding functions into separate devices. The control device uses a global knowledge of the network topology to determine a path through the network of forwarding devices for individual data flows. In this way, the routing control device may, for example, establish paths that minimize delay or maximize bandwidth through the network.

BRIEF SUMMARY

In an embodiment, a computer-implemented method discovers routes from network forwarding devices to a routing control device. The discovery method includes receiving a control packet on a port of a forwarding device. The method then, based at least in part on the port that received the control packet, identifies which port on the forwarding device to forward data to reach the routing control device. In response to receipt of a new data stream at the forwarding device, the method sends a command to the routing control device on the identified port. The command instructs the routing control device to determine a path through the forwarding devices to a destination and to configure the forwarding devices to forward the new data stream along the determined path. The method then forwards the new data stream according to the configuration commands of the routing control device.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Figure 1A:
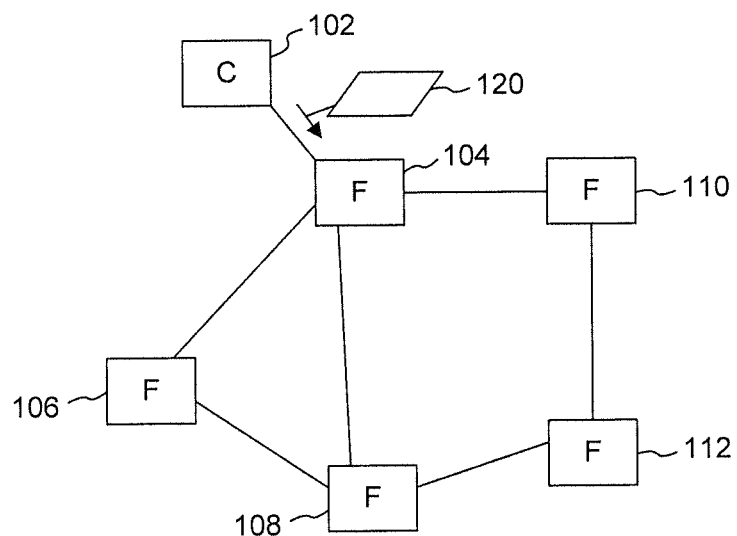
FIG. 1A is a diagram that illustrates a routing control device that sends control packets to a forwarding device.

As mentioned above, SDN routing techniques use global knowledge of the network topology to route packets efficiently. These techniques use a routing control device and forwarding devices separate from each other. When a forwarding device receives a new data flow through a network, the forwarding device contacts the routing control device to determine a new path for the data flow. The routing control device determines the new path through the network's forwarding devices and configures the forwarding devices accordingly.

To operate, the routing control device and forwarding devices need to be configured with network information. In particular, to request that a new path be created through the interconnected forwarding devices, the forwarding devices need to know how to route data to the routing control device. And, the routing control device needs to know the network topology to determine a path through the network. Manually configuring this information can be time-consuming and error-prone.

Embodiments disclosed here enable topology information to be discovered automatically. In an embodiment, the routing control device is connected to a forwarding device and sends control packets to it. The control packet contains the address of the control device as its source address in an address field. The control device also attaches a serial number to each control packet.

The forwarding device attaches performance information that indicates, for example, how long it would take for the network to send information from the forwarding device to the routing control device. Then, the forwarding device broadcasts, or floods, the control packet on its other ports, which are connected to other forwarding devices. And, if the other forwarding devices have not previously rebroadcasted a packet with better performance information, they update the performance information and re-broadcast the packet.

As the forwarding devices receive the control packets, they remember which port the control packet received the packet with the best performance information. This port, the forwarding device knows, is on the fastest route to the routing control device. And, each forwarding device can request that a label-switched path be set up on that route to the routing control device.

With the paths established, the forwarding devices send information concerning their neighborhood network topology and network condition to the control device. Using such information from all forwarding devices, the control device can create a database of global network topology and network condition. This topology database enables the control device to establish a path between a sources forwarding device and a destination forwarding device in the network.

Once this path is established to the controller, the controller may, at any later time, determine a better path for the communications between the forwarding device and the controller using another method which may utilize more complete topology and performance information. If this better path is determined, the existing path may be replaced by the controller resignalling the specific new path and then eliminating the existing path.

The Detailed Description that follows is divided into five sections. The first section describes, with respect to FIGS. 1A-1C, a control device in the network sending control packets to each forwarding device, and gathering topology and network condition information from the forwarding devices. The second section describes, with respect to FIGS. 2-3, setting up bidirectional connections between the control device and each forwarding device. The third section describes, with respect to FIGS. 4A-B, using the control device to establish and transfer data without requiring edge routers to buffer a large amount of packets. The fourth section describes, with respect to FIG. 5, using multiple control devices in the network. The fifth and final section describes, with respect to FIG. 6, a control device system and its modules and a forwarding device system and its modules.

Control Device and Control Packets

FIG. 1A is a diagram 100 illustrating a communication network. The communication network may be a local area network (LAN), metropolitan area network (MAN), or wide area network (WAN). It may utilize any point-to-point or multipoint-to-multipoint networking protocols. The network access protocols used may include, for example, Multi Protocol Label Switching (MPLS), Ethernet, Asynchronous Transfer Mode (ATM), High-Level Data Link Control (HDLC), or Packet Relay.

The communication network includes a plurality of forwarding devices, such as forwarding devices 104, 106, 108, 110, and 112, interconnected by links. Forwarding devices are devices that forward packets, including devices at the data link layer (OSI layer 2) and the network layer (OSI layer 3).

The communication network also includes a routing control device 102. Routing control device 102 may be connected to at least one forwarding device, for example forwarding device 104. Routing control device 102 may be geographically remote from other forwarding devices in the network.

In an example, a user may send data from a source forwarding device, for example forwarding device 106, to a destination forwarding device, for example 110. The data may be a stream divided into packets, and each packet may specify forwarding device 110, or another downstream device, as its destination.

Routing control device 102 provides intelligent routing for establishing a network connection. To do so, the control device 102 requires knowledge of the topology and the condition of the network links and devices. Routing control device 102 is directly connected a forwarding device 104. For the control device to gain knowledge of the network, the control device 102 sends a control packet 120 to the forwarding device 104.

Control packet 120 may include an indication that the packet is a control packet, an identifier of routing control device 102, such as its Media Access Control address, and a serial number of the packet. In an embodiment the control device 102 may send a new control packet at uniform time intervals. Each time control device 102 sends a new packet, control device 102 may increment the serial number, sending the new control packet out with a different number.

In an illustrative example, control packet 120 may include the following information:

Type Flag: C (for control packet)
MAC Address of Control Device: 01:23:45:67:89:ab
Serial No. of Control Packet: 1

Figure 1B:
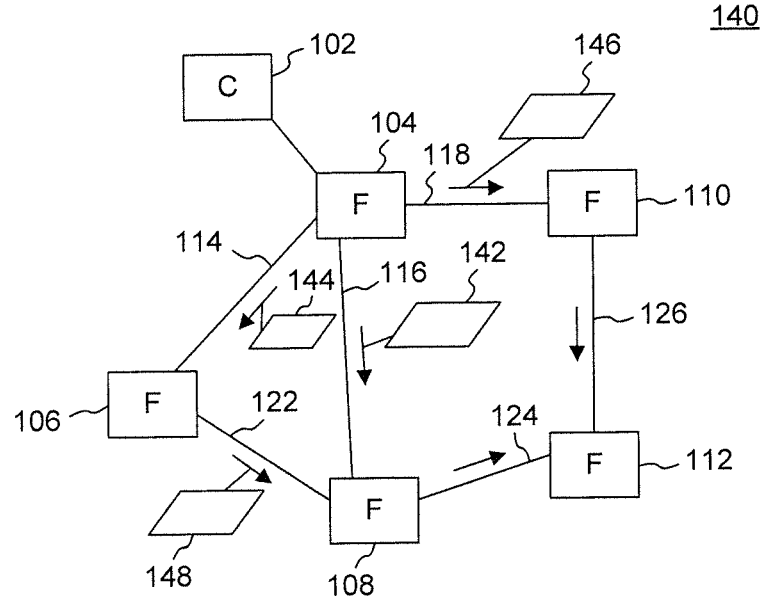
FIG. 1B is a diagram that illustrates forwarding devices flooding control packets throughout the network.

Once routing control device 102 sends the control packet 120 to the adjacent forwarding device 104, the network forwarding devices flood the packet across the network as illustrated in FIG. 1B.

FIG. 1B is a diagram illustrating the network forwarding devices flooding a control packet across the network. After receiving control packet 120, the forwarding device 104 may send out the control packet on all its ports other than the port that received it.

As mentioned above, when routing control device 102 generates control packet 120, the control device may include its address and a serial number in the control packet. As forwarding device 104 receives the control packet, and before forwarding it, the forwarding device 104 may make two modifications. First, it may add its own identifier (such as its MAC address) to the control packet. This address is added to an address field in the control packet for keeping track of all the forwarding devices the control packet travels through. Second, forwarding device 104 may modify a performance metric in the control packet. The performance metric can include, for example, the delay in sending the control packet from control device 102 to forwarding device 104. This delay information may be collected, for example, by forwarding device 104 using Link Layer Discovery Protocol (LLDP) packet exchanges. The delay may be determined as a moving average or otherwise smoothed out to prevent volatile changes as the network reacts to changes in traffic volume.

With those two modifications, forwarding device 104 forwards the control packet on its other ports as control packets 142, 144, and 146. At this point, all three control packets 142, 144, and 146 may contain the same information. Continuing the example above and assuming the MAC address of forwarding device 104 is 02:02:02:02:02:bc and the delay between control device 102 and forwarding device 104 is 5 ns, the control packets 142, 144, and 146 may include the following information:

Type Flag: C (for control packet)
MAC Address of Control Device: 01:23:45:67:89:ab
Serial No. of Control Packet: 1
Addresses of Intermediate Forwarding Devices: 02:02:02:02:02:bc
Performance Metric: 5 ns Forwarding device 104 forwards control packet 144 on link 114 to forwarding device 106; control packet 142 on link 116 to forwarding device 108; and control packet 146 on link 118 to forwarding device 110.

Once forwarding device 106 receives the control packet 144, it adds its own address to the address field and updates the performance metric of the control packet to generate a control packet 148. For example, forwarding device 106 may add the delay to transmit data from forwarding device 106 to forwarding device 104. Continuing the example above and assuming the MAC address of forwarding device 106 is 03:03:03:03:03:cd and the delay between controller 102 and forwarding device 104 is 2 ns, the control packet 148 may include the following information:

Type Flag: C (for control packet)
MAC Address of Control Device: 01:23:45:67:89:ab
Serial No. of Control Packet: 1
Addresses of Intermediate Forwarding Devices: 02:02:02:02:02:bc, 03:03:03:03:03:cd
Performance Metric: 7 ns Forwarding device 106 transmits packet 148 on link 122 to forwarding device 108.

Forwarding device 108 receives control packets 142 and 144. Using the delay information in each of these two control packets, forwarding device 108 can choose to establish a path with less delay to the control device 102. Using the address sequence field in the control packet, forwarding device 108 can know to get to the control device, which neighboring forwarding device it needs to communication with.

For example, forwarding device 108 may know that the time to transmit data to forwarding device 106 on link 120 is 3 ns, and that the time to transmit data to forwarding device 104 on link 116 is 9 ns. Adding that to the performance metrics received in packet 148 and 142, forwarding device 108 can determine that transmission to control device 102 via forwarding device 106 takes 10 ns, while transmission via forwarding device 104 takes 14 ns. For that reason, forwarding device 108 may choose to route data to control device 102 via forwarding device 106, and not device 104, taking the faster path.

Also, forwarding device 108 may reforward control packets 142 and 148. If forwarding device 108 receives the packet denoting the faster path—in this case, packet 148—before the packet denoting the slower path—in this case, packet 142—the forwarding device 108 may not forward the slower packet. This is because forwarding device 108 knows that any data headed to control device 102 should take the faster path through forwarding device 106, regardless of whether it originated from forwarding device 108 or another forwarding device, such as device 112.

Having determined the best path to control device 102 is through forwarding device 106, forwarding device 108 may establish a bi-directional path with forwarding device 106. In an embodiment, to establish this bi-directional path, forwarding device 108 sets a rule in its routing table, which also may be referred to a forwarding table, that in order to get to the control device, it sends a packet on a specific port (the port that it received control packet 144) and with a particular label. This information is communicated with forwarding device 106, so both forwarding devices follow the same rule. Therefore, when the forwarding device 106 receives the packet from forwarding device 108 with the set label and on the set port, it knows that this packet is intended for control device 102. Similarly, forwarding device 106 knows to forward traffic for control device 102 through forwarding device 104. So, forwarding device 106 sets up a label with forwarding device 104 to route data to control device 102. Labels may also be set up to route data from control device 102 through forwarding device 106 to forwarding device 104 in a similar manner.

In this way, by analyzing and reforwarding control packets from a control device, each forwarding device can discover how to communicate with the control device and set up a label-switched path to the control device. As described below with respect to FIGS. 4A-B when the forwarding device receives a new data stream, the forwarding device may forward packets from the new data stream to the control device until the control device sets up a path for the packets through the network.

Figure 1C:
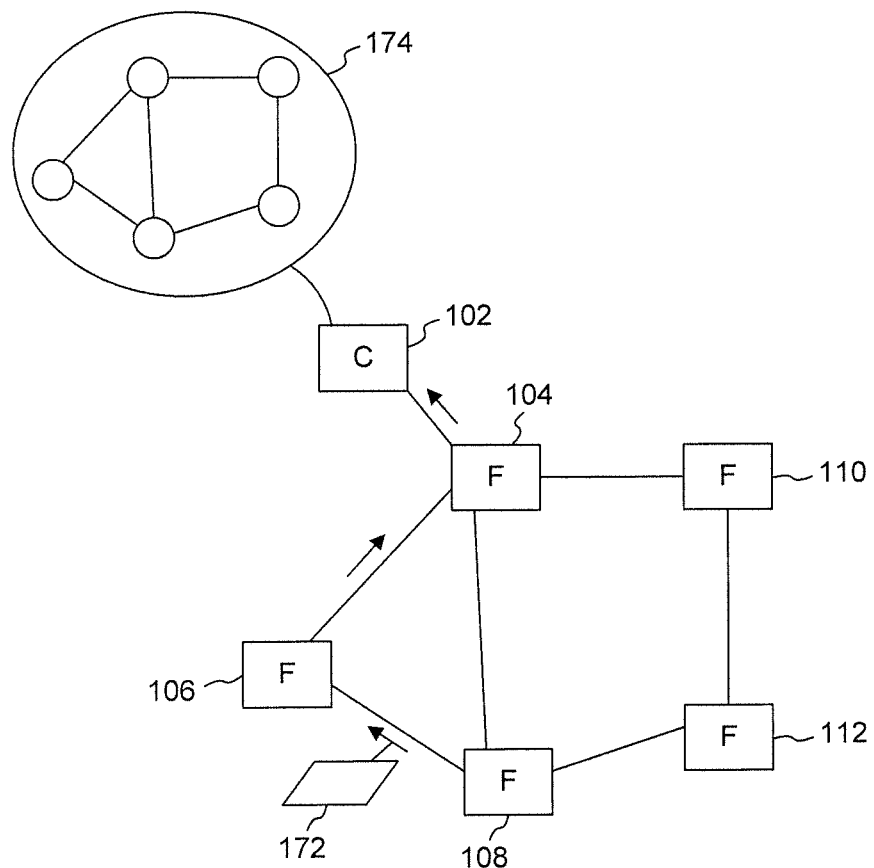
FIG. 1C is a diagram that illustrates how the control device collects information reflecting the network topology.

In addition to using the label-switched path to forward data to the control device, embodiments may also use the label-switched path to help the control device discover the topology information of the network as illustrated in FIG. 1C.

FIG. 1C is a diagram 170 that illustrates control device 102 collecting information reflecting the network topology.

Each forwarding device sends information to the routing control device that shows what forwarding devices it is connected to, and what the conditions of the surrounding links and forwarding devices are. Conditions of surrounding links and forwarding devices can include, for example, traffic and congestion information, latency, packet loss rate, jitter, etc. This information may be collected, for example, using Link Layer Discovery Protocol (LLDP). In an embodiment, the forwarding devices send this information periodically. And, the forwarding devices use the paths established between them and the control device to send this information.

In the example shown in FIG. 1C, a path for forwarding device 108 to the control device 102 is established. This path includes forwarding devices 108, 106, and 104. Forwarding device 108 sends the information including its surrounding topology to the control device 102. In an example, forwarding device 108 sends this information in a packet 172 to routing control device 102.

Routing control device 102, using the topology information it receives from all of the forwarding devices including forwarding device 108, creates a database 174 that reflects the topology of the network of the forwarding devices.

Establishing Paths to and from the Control Device

Figure 2:
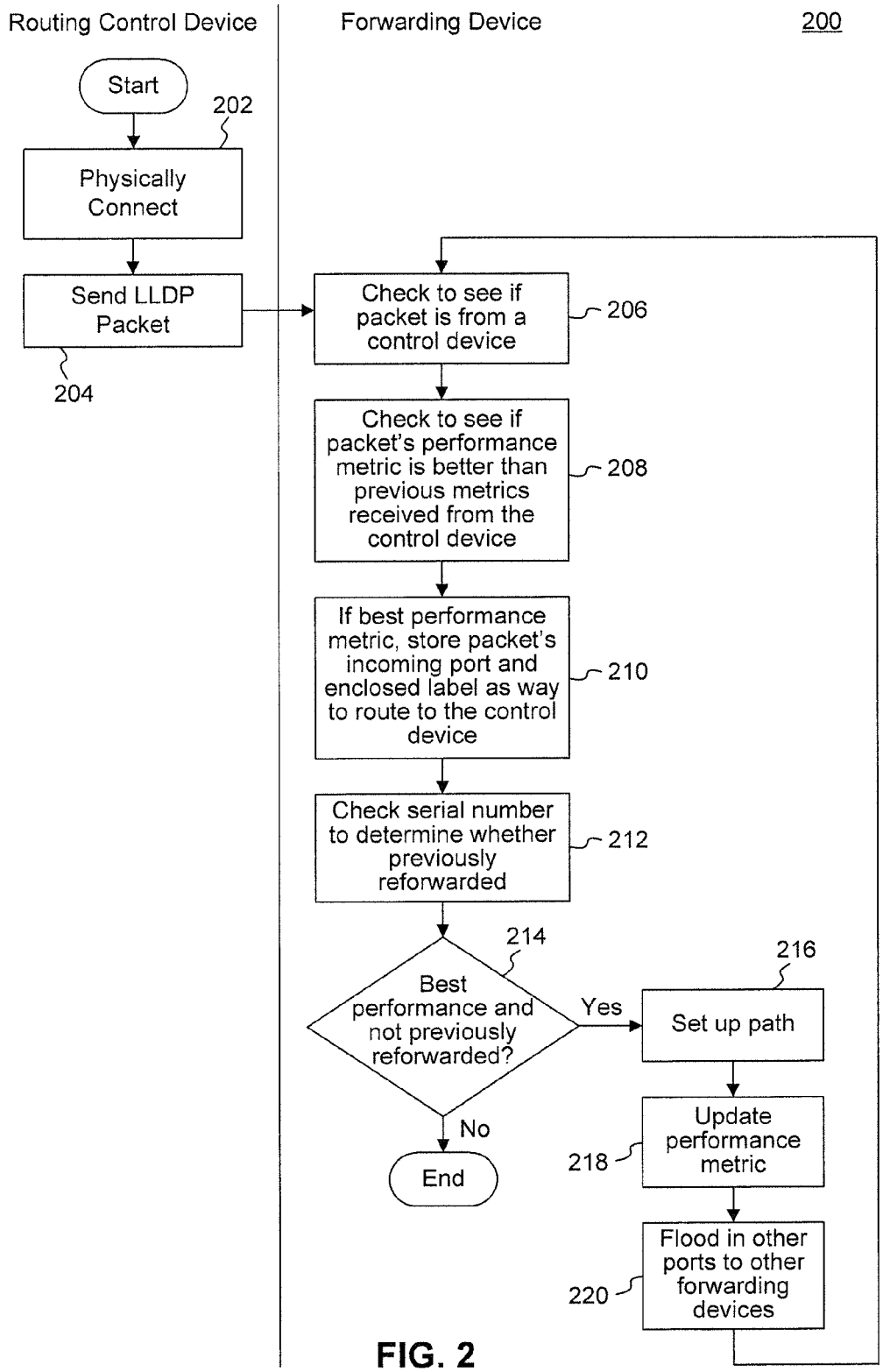
FIG. 2 is a flowchart that illustrates a method for finding a path from the control device to a forwarding device.

FIG. 2 is a flowchart that illustrates a method 200 for finding a path from the control device to a forwarding device.

At step 202, the control device physically connects to a forwarding device of the network of forwarding devices. At step 204, the control device sends a control (or discovery) packet, for example a Link Layer Discovery Protocol (LLDP) packet, to the forwarding device it is connected to.

The forwarding device receiving the packet, at step 206 verifies whether the packet originated from a control device. In an example, the forwarding device can verify that the packet is from a control device by, for example, checking to see if a particular flag is raised.

The control packet includes a performance metric that shows conditions of the network links or network devices. For example the metric can show link latency. Therefore, in this example, a lower metric shows a lower latency therefore a better performance. The metric can also be a function of multiple conditions such as latency, packet loss, jitter etc.

Each forwarding device that receives the control packet, updates the performance metric. The updated metric, for example, shows the additional latency for the control packet to reach the forwarding device from a previous, or upstream, forwarding device. After updating the metric, the forwarding device floods the control packet on all its ports other than the port where the control packet was received.

A forwarding device may receive again the same control packet that it had received before. This may happen because the control packets are flooded through the network. The forwarding device can recognize the repeat control packet by the unique serial number that the control device attaches to each control packet.

The forwarding device, at step 208, checks to see if packet's performance metric is better than previous metrics received from the control device. If the metric is the best performance metric among all control packets received by the forwarding device, at step 210, the forwarding device stores packet's incoming port as the best way to reach the control device.

At step 212, the forwarding device checks the serial number to determine whether the control packet has been previously forwarded, to avoid a control packet from indefinitely circulating through the network. Since the control packet adds a unique serial number to each control packet it generates, the forwarding devices can use the serial number of a control packet to determine whether it has previously forwarded the control packet or not. Or, the forwarding devices can use the serial number to determine whether the current control packet is out of date if, for example, they had previously forwarded a more recent control packet with a greater serial number. A number of other mechanisms may be used to avoid indefinitely circulating packets through the network such as hashes or checksums of at least a portion of the control packet.

The forwarding device, at step 214, determines whether the packet has not previously been forwarded and includes a metric showing the best performance. If either the control packet does not show the best performance metric, or it has been previously forwarded by the forwarding device, the forwarding device discards the packet and the process ends.

If the control packet contains the best performance metric and is not previously forwarded, the process 200 sets up path at step 216. Step 216 is described in details in the description of FIG. 3 below.

Next, at step 218, the forwarding device updates the performance metric to reflect the performance of the link connecting the upstream forwarding device and the current forwarding device, and the performance of the two forwarding devices themselves. Next, at step 220, the receiving forwarding device floods the packet on all its ports, other than the port where it received the control packet. In this way, the updated control pack is sent to other forwarding devices.

The other forwarding devices repeat the process from step 206, processing the packet in the same manner.

Figure 3:
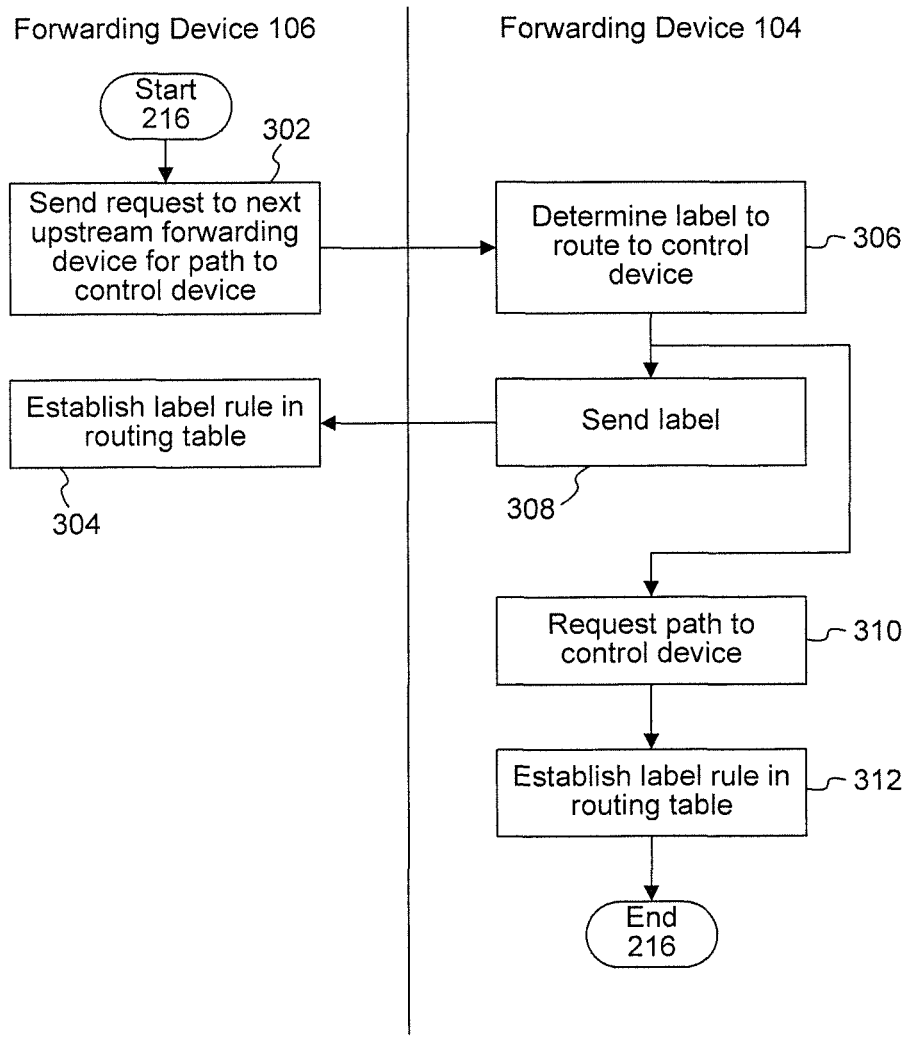
FIG. 3 is a flowchart that illustrates a method for setting up a path from each forwarding device to the control device.

FIG. 3 is a flowchart that illustrates a method 216 for setting up a path between forwarding devices 104 and 106. As an example, if a control packet has traveled to forwarding device 106, from the forwarding device 104, forwarding device 104 is an upstream forwarding device for 106.

Continuing the above with respect to FIGS. 1A-B and 2, assume forwarding device 106 receives from the upstream forwarding device 104 a new control packet and the new control packet has the best performance characteristics to date. For this reason, a path is set up at step 216 in FIG. 2.

At step 302, forwarding device 106 sends request to the next upstream forwarding device for a path to the control device. Forwarding device 104 at step 306 determines a label for establishing the path. Forwarding device 104 sends this label to forwarding device 106, at step 308. Forwarding device 106 establishes this label rule accordingly in its routing table at step 304.

At step 310, forwarding device 104 requests path to control device. To create a path, forwarding device 104 may request a label from another upstream forwarding device, repeating steps 302, 306, 308, and 310. Forwarding device 104 establishes label rule in its routing table at step 312.

For example, forwarding device 104, after receiving the request from forwarding device 106 at step 302, chooses label L1 for the path between the two. After sending this label to forwarding device 106, forwarding device 106 will enclose this label on all the data packets destined to the control device.

In this example, forwarding device 104, upon receiving data packets with label L1 on the port connected to the forwarding device 106, forwards the packets to the control device. To forward packets to the control device, forwarding device 104 may know (having established a label rule at step 312) to forward on a particular port with a particular label. In this way a path from the forwarding device to the control device is established.

Also, a path may be established in the other direction: from the control device to the forwarding device in a similar manner. In that case, each forwarding device may set up a label in its routing table. The entry in the routing table may include the associated port to route the data to.

After such paths are established among forwarding devices in the network, a path between the control device to and from each forwarding device in the network exists. In the example of FIG. 3, after the path is established between forwarding device 106, forwarding device 104, and the control device, forwarding device 106 uses this path to send data to the control device. And vice versa, the control device uses this path for sending data to the forwarding device 106.

Establishing Fast Paths for New Data Streams

Figure 4A:
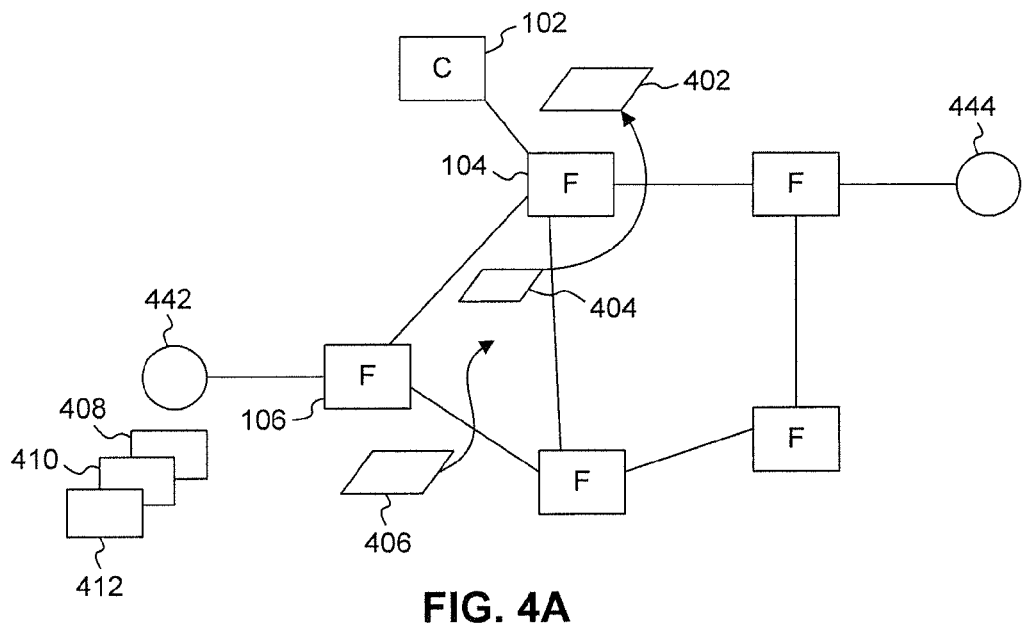
FIG. 4A is a diagram that illustrates a network connection using a path from a forwarding device to the control device.

FIG. 4A shows a diagram 400 illustrating a data stream from network user 442 addressed to server 444. The data stream includes packets 402, 404, 406, 408, 410, and 412. When the first packet of the data stream—packet 402—reaches forwarding device 106, it is routed to control device 102. Control device 102 determines that this packet belongs to a new connection and starts the process of establishing a fast path for the connection, which does not flow through the control device 102.

In the example, after packet 402, packets 404 and 406 are also sent. Forwarding device 106 may buffer packets 404 and 406 or may forwards those packets onto control device 102, just as it did with the first packet 402.

After the control device receives the first packet, it sends the packet to forwarding device 104. Forwarding device 104, using the destination address included in the packet, and the paths set up at step 216 in FIGS. 2 and 3, forwards the packet to the corresponding port with the corresponding label.

Next, the control device computes a path from the source to the destination. The path comprises network links and routers, but not the control device. For example, using the MPLS protocol, the control device creates a label-switched path (LSP) for the data stream. To determine the path, the control device may take into account current or historical bandwidth usage. For example, the control device may consider network usage during previous weeks (or another cyclical period). The control device may also create multiple paths for the connection to enable load balancing on multiple paths.

The control device may also take into account latency, jitter, packet loss, or any other performance metric across various paths, the user's service level agreement, or the type of data being transferred. For example, broadcast video data may require a great deal of bandwidth, but latency may be relatively unimportant. Voice-over-IP (VoIP) data, on the other hand, may not require as much bandwidth, but latency may be more important. For broadcast video data, the control device could select a high-bandwidth, high-latency path, and, for VoIP data, the control device could select a low-bandwidth, low-latency path.

In another embodiment, the control device may route data through a particular server. For example, data having a certain type or directed to a certain destination may need to be scrubbed by a particular scrubbing server en route. The scrubbing server may be used to scan the data for malicious content, to monitor incoming data, or to perform other analysis on the data. In that embodiment, the control device may determine such that it goes through the particular scrubbing server or set of servers.

After determining the fast path, the control device updates routing tables for each forwarding device along the path. If multiple paths are computed for the data stream, the control device creates routing tables in accordance with all the paths. In one embodiment, the updated routing tables may instruct the forwarding device how to forward packets having a particular combination of source/destination addresses and source/destination ports. In an alternative embodiment, the data stream may be identified with a label and the updated routing table may indicate how to forward packets having the label.

The control device sends updated routing tables to network routers. The control device can use the paths established to all the forwarding devices in step 216 to send the routing tables. An example of how the routers are configured is illustrated in FIG. 4B.

Figure 4B:
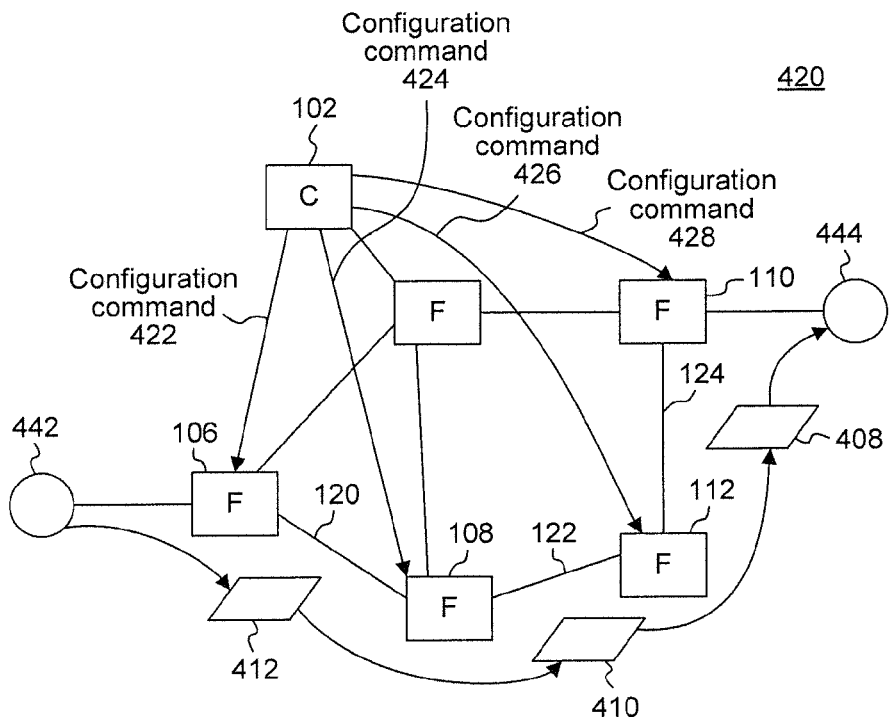
FIG. 4B is a diagram that illustrates the routing control device setting up a fast path.

FIG. 4B shows a diagram 420 illustrating how control device 102 configures the network forwarding devices to establish the path between user 442 and server 444.

In FIG. 4B, control device 102 determines that the data stream between user 442 and server 444 follows the path including links 120, 122, 124 and forwarding devices 106, 108, 112, and 110. To configure the forwarding devices, the control device 102 sends the updated routing tables using the configuring commands 422, 424, 426, and 428. These configuring commands configure all the forwarding devices on the fast path connecting user 442 to destination 444. In particular, command 422 instructs forwarding device 106 to forward packets in the data stream to link 120; command 424 instructs forwarding device 108 to forward packets in the data stream to link 122; command 426 instructs forwarding device 112 to forward packets in the data stream to link 124; and command 428 instructs forwarding device 110 to forward packets in the data stream to link 124.

In an embodiment, to ensure that packets continue to flow through the control device until the path is fully established, routers along the path are configured from the egress point (forwarding device 104) to the ingress point (forwarding device 106). First, command 428 configures forwarding device 110. Second, command 426 configures forwarding device 112. Third, command 424 configures forwarding device 108. Fourth, command 422 configures forwarding device 106.

Referring back to FIG. 4A, until the path is established, user 442 continues to transmit packets of the data stream—packets 402, 404, and 406. As mentioned above, forwarding device 106 continues to direct these packets on the path to control device 102.

On receipt of these packets, control device 102 routes them to their destination using the previously determined default path at step 216 in FIG. 2. In this way, while the path through the network is being established (as illustrated in FIG. 4B), packets continue to be routed to their destination, avoiding the need to buffer the initial packets in the edge router.

Once the path is set up (e.g., the forwarding devices are configured with their new routing tables), data flows along the fast path set up by the control device. At this point, data may flow at a greater rate through the forwarding devices and lower end to end latency, since it no longer goes through the control device.

Multiple Control Devices

Figure 5:
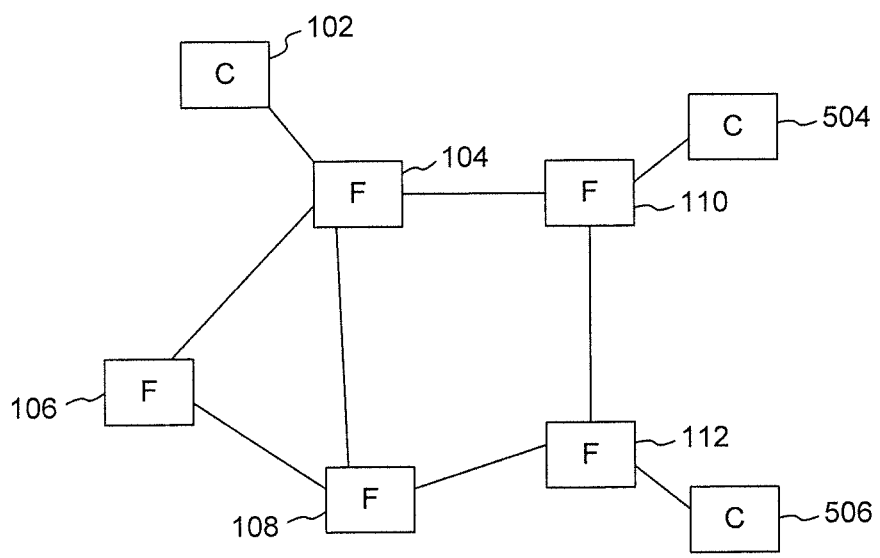
FIG. 5 is a diagram that illustrates a network with multiple control devices.

FIG. 5 is a diagram that illustrates a network with multiple control devices. In an example embodiment shown in FIG. 5, control device 102 is connected to forwarding device 104, control device 504 is connected to forwarding device 110, and control device 506 is connected to forwarding device 506.

In the example embodiment, each control device 102, 504 or 506 sends control packets, periodically or at different time intervals to the forwarding device directly connected to it. And following the same process as illustrated in FIG. 2, each control device establishes two-directional paths to each forwarding device in the network.

Each forwarding device, in the example embodiment of FIG. 5, sends information showing the topology of its neighboring forwarding devices and the network condition information to each control device in the network. In the embodiment, forwarding devices use the bi-directional paths established at step 216 of process 200, to send this information. In an embodiment, forwarding devices send this information to control devices periodically or at different time intervals.

A single physical network may be mirrored on multiple control devices with multiple topology databases for redundancy purposes. Each of these control devices has paths established between themselves and each router in the network. In the event that a default path to one control device is failed, traffic may choose a path to a different control device.

In an example embodiment, each forwarding device picks one control device at a time for forwarding data and establishing a fast path to a destination. In the embodiment, the forwarding device can pick any one of the control devices based on a choosing algorithm. The choosing algorithm can be, for example, a round robin algorithm. The forwarding device may also consider network load or number of new connections a control device is setting up at a time in the algorithm for choosing a control device. In addition, the forwarding device may ask the controller with the lowest latency to establish a fast path to a destination. The round robin approach may be used in conjunction with the lowest-latency approach. For example, a device may choose to balance traffic across multiple paths to the controllers, perhaps by rounding the metric to a closest 5 for example, therefore treating performance values of 3, 4, 5, 6, 7 as the same as a value of 5. Among those controllers with the lowest rounded metric, the forwarding device may adopt a round robin algorithm to select the controller to create the fast path. This helps to limit the impact of slight modifications in the performance values as the network reacts to real world situations.

In an embodiment, control devices in the network need not be synchronized with one another. If a control device fails, after not receiving control packets from that control device for a period of time, forwarding devices remove the labels for maintaining a path to that control device. Forwarding devices continue using other control devices with the same choosing algorithm such as round robin.

Having multiple control devices highly increases the resiliency of the network. If a control device fails, or a link connecting to a control device fails, forwarding devices can continue using other control devices in the network. Multiple control devices also help balancing load in the network. By intelligently choosing a control device that has a lesser number of new connection requests, or by choosing a control device with the best path to, such as the path with lowest latency, forwarding devices can avoid congested segments of the network when requesting a new connection.

Control Device and Forwarding Device Modules

Figure 6:
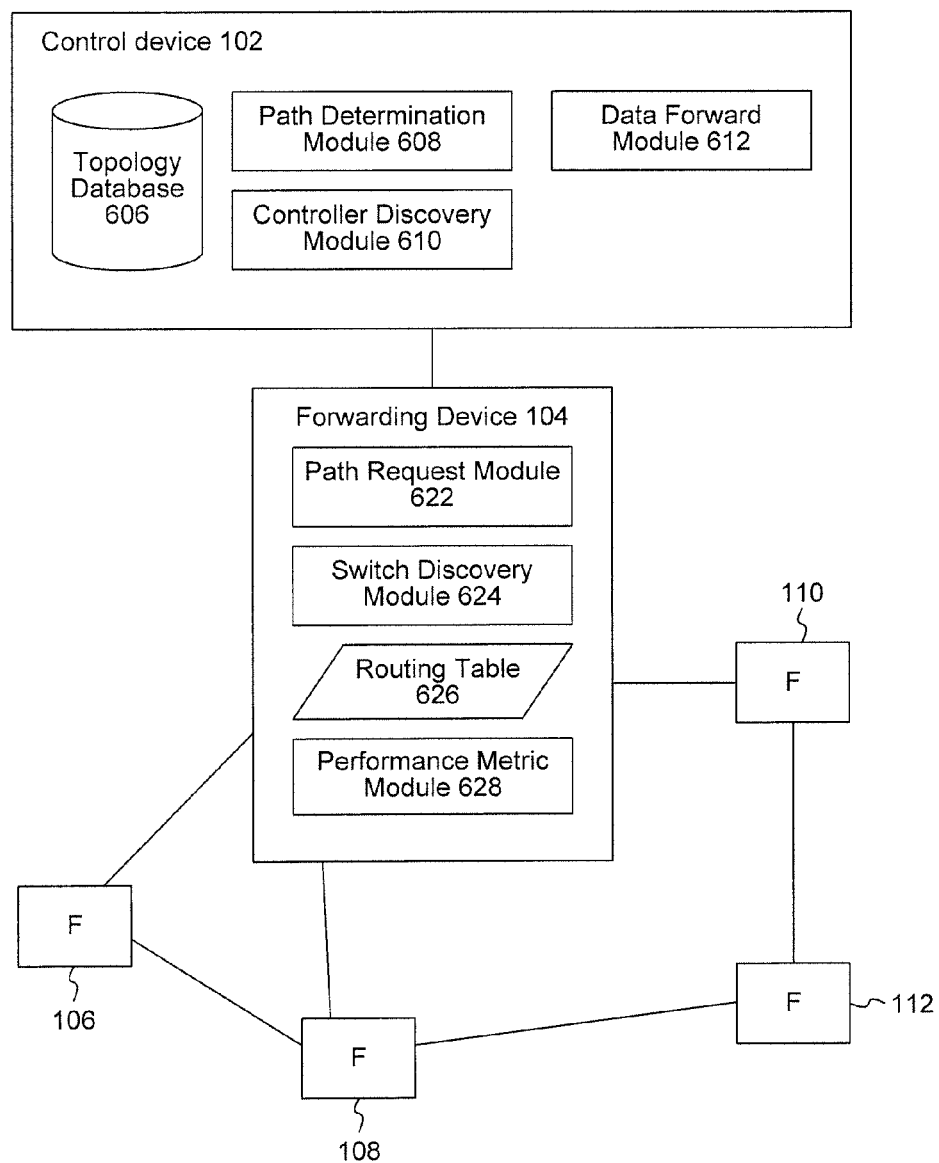
FIG. 6 is a diagram that illustrates modules of a control device and a forwarding device.

FIG. 6 shows a diagram 600 illustrating control device 102 and its modules and forwarding device 104 and its modules.

In particular, control device 102 includes a controller discovery module 610, a path determination module 608, a data forward module 612, and a topology database 606. The various modules may operate as described above with respect to the method in FIG. 2.

Controller discovery module 610 is configured to determine a topology of the network of the forwarding devices. The controller discovery module 610 sends control packets to the forwarding device directly attached to the control device. The control packets include the address of the control device and a serial number. Using the combination of the address and the serial number each control packet can be uniquely identified throughout the network.

As control packets travel through the network, each forwarding device receiving a control packet adds its own address to the control packet. Also, each forwarding device updates the metric showing network characteristics to each control packet. Upon receiving a control packet, a forwarding device knows the path the control packet has traveled to arrive at the forwarding device from the control packet. Also using the performance metric information, the forwarding device knows which path, among multiple paths traveled by multiple forwarding packets, is the best path to the control device, as described by process 200. Therefore forwarding devices can dynamically update the best path to the control device.

After a path to a forwarding device is set up, controller discovery module 610 receives topology and network condition information from the forwarding devices in the network. Using this information and similar information from other forwarding devices in the network, controller discovery module 610 creates a topology database 606.

Topology database 606 stores the discovered topology of the forwarding devices in the network. Topology database 606 reflects the current topology of how forwarding devices and links are connected together. Also, topology database 606 stores information showing the current condition of the network. Condition of the network can include latency, packet loss, congestion or jitter on network links or devices.

Path determination module 608 establishes paths for new network connections. Upon a request for connection from a source forwarding device, path determination module 608 determines a connection path from the source forwarding device to a destination forwarding device. To determine a path, path determination module 608 uses topology database 606. Using the topology and network condition information stored in the topology database 606, path determination module 608 can find an optimum path from the source forwarding device to a destination. The optimum path can, for example, be a shortest path, or a path with least delay, or a path with least packet loss.

After determining that path for a connection, path determination module 608 also sends configuring commands to each forwarding device on the determined path. As illustrated in the example embodiment in FIG. 4B, path determination module creates and sends the configuring commands 422, 424, 426, and 428. The configuring commands configure the corresponding forwarding devices. The configured forwarding devices route packets belonging to the connection on the path determined for the connection by path determination module 608.

Data forward module 612 carries the initial packets for the requested connection while path determination modules determine the path for the connection and configures the forwarding device by sending configuring commands. As illustrated in FIG. 4A, the initial packets 402, 404, 406, 408, and 410 are forwarded to the control module over the path from the source forwarding device to the control device. Data forwarding module 612 forwards the initial packets over the path from the control device to the destination forwarding device, while the connection path is being established.

In the example embodiment shown in FIG. 6, forwarding device 104 includes a path request module 622, a switch discovery module 624, a routing table 626, and a performance metric module 628.

Path request module 622, after receiving a request for a new data connection at the forwarding device, sends a message to the routing control device requesting establishing a connection path. The path request module 622 uses the path to the control device, set up at step 216 of process 200, to send the request for establishing connection path. The path request instructs the routing control device to determine a path from the source forwarding device to a destination forwarding device. The path determination module 608 then determines the connection path and configures the forwarding devices to forward the new data stream along the determined path.

Switch discovery module 624 receives the control packets sent by the controller discovery module 610 of the control device. Switch discovery module 624 determines a path from the forwarding device to the control device as shown in step 216 of method 200. In an embodiment, switch discovery module 624 makes this determination based on the information in the control packet and the port on which it receives the control packet.

In order to establish the path from the forwarding device to the control device, switch discovery module 624 identifies, based in part on the port that received the control packet, which port on the forwarding device to forward data to reach the routing control device.

In an embodiment, if the performance metric in the control packet arriving from a neighboring device shows a path from the control device to the forwarding device with best performance, switch discovery module 624 determines the label to route to control device, as shown in step 306 of method 300.

Switch discovery module 624 also, after determining whether a received control packet indicates a best performance path and is not already forwarded on other ports of the forwarding device, as shown in step 214 of process 200, floods the control packet on its ports other that the port where it has received the control packet.

Routing table 626 of a forwarding device contains information on how to forward a data packet in the network. Configuring commands 422, 424, 426, and 428 update the routing table in the forwarding devices with information on how to forward a packet. Also after receiving a label for setting up a path to control device 102, the switch discovery module 624 establishes forwarding rules in the routing table 626 based on the determined labels.

Performance metric module 628 updates the performance metric field of an incoming control packet. An incoming control packet includes a field that contains a network performance metric of the path from the control device up to the previous forwarding device. The performance metric module updates the performance metric field so that it reflects the performance of the path up to the current forwarding device.

Performance metric module 628 also determines whether the forwarding device has previously forwarded another control packet, with a better performance metric. Performance metric module 628 informs the switch discovery module 624 of whether a previous same control packet with a better metric has been flooded on the forwarding device ports.

CONCLUSION

The term "user," as used herein, may encompass both a customer of the network connectivity service, such as an employee of a business that utilizes the network connectivity service, and a network administrator of the service provider itself. Users may also be at different companies or organizations.

Topology database 606 may be any stored type of structured memory, including a persistent memory. In examples, each database may be implemented as a relational database or file system.

Each of the devices and modules in FIG. 6 may be implemented in hardware, software, firmware, or any combination thereof.

Each of the devices and modules in FIG. 6 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for discovering routes from a plurality of forwarding devices to a routing control device, comprising:
    (a) receiving, on a data link layer port of a forwarding device of the plurality of forwarding devices, a control packet originating from the routing control device, wherein the data link layer port connects the forwarding device to another forwarding device via a link, and the control packet includes a performance metric indicating an estimated time to route a packet from the other forwarding device to the routing control device;
    (b) identifying, based at least in part on (i) the data link layer port that received the control packet and (ii) the performance metric in the control packet, which data link layer port, identified by a MAC address, on the forwarding device to forward data to reach the routing control device;
    (c) in response to receipt of a new data stream at the forwarding device, sending a message to the routing control device on the data link layer port identified in (b), the message instructing the routing control device to determine a path through the plurality of forwarding devices to a destination and to configure a subset of the plurality of forwarding devices to forward the new data stream along the determined path; and
    (d) forwarding the new data stream according to configuration commands of the routing control device.

2. The method of claim 1, wherein the sending (c) comprises forwarding the initial packet of the new data stream through the control device.

3. The method of claim 1, further comprising
    (e) forwarding, from the forwarding device, the control packet to another forwarding device on a remaining data link layer port of the forwarding device different from the data link layer port that the packet was received on in (a).

4. The method of claim 3, further comprising:
    (f) at the forwarding device, sending a label to another forwarding device in the plurality of forwarding devices, wherein the label, when attached to a packet received at the forwarding device indicates to the forwarding device to forward the packet toward the routing control device on the data link layer port identified in (b).

5. The method of claim 3, wherein the control packet includes a serial number, and further comprising:
    (f) determining whether the forwarding device has previously forwarded another control packet that is from the routing control device, has the serial number, and indicates another estimated time to route a packet from the forwarding device to the routing control device lower than the estimated time in the control packet, and
    wherein the step forwarding (e) occurs when the forwarding device is determined to have not previously forwarded the other control packet in (f).

6. The method of claim 1, further comprising:
    (e) sending a message to the routing control device on the data link layer port identified in (b), the message identifying the forwarding device and other forwarding devices in the plurality of forwarding devices that the forwarding device is connected to,
    wherein the routing control device uses the message to build a database representing a topology of the network and uses the database to determine the path.

7. The method of claim 1, wherein the control packet includes an identifier of the routing control device, and further comprising:
    (e) receiving, on a data link layer port of the forwarding device, another control packet including an identifier of another routing control device;
    (f) identifying, based at least in part on the data link layer port that received the other control packet, which data link layer port on the forwarding device to forward data to reach the other routing control device; and
    (g) in response to receipt of a new data stream at the forwarding device, determining which of the routing control device and the other routing control device to send the message instructing that the path be configured through the plurality of forwarding devices.

8. A forwarding device for discovering routes to a control device, comprising:
a switch discovery module configured to: (i) receive, on a data link layer port of the forwarding device, a control packet originating from the routing control device, wherein the port connects the forwarding device to another forwarding device via a link and the control packet includes a performance metric indicating an estimated time to route a packet from the other forwarding device to the routing control device, and (ii) identify, based at least in part on (i) the data link layer port that received the control packet and (ii) the performance metric in the control packet, which data link layer port, identified by a MAC address, on the forwarding device to forward data to reach the routing control device;
a path request module configured to, in response to receipt of a new data stream at the forwarding device, send a message to the routing control device on the identified data link layer port, the message instructing the routing control device to: (i) determine a path through the plurality of forwarding devices to a destination and (ii) configure a subset of the plurality of forwarding devices to forward the new data stream along the determined path; and
a routing table within the forwarding device populated to enable the forwarding device to forward the new data stream according to configuration commands of the routing control device.

9. The device of claim 8, wherein the path request module is further configured to forward the initial packet of the new data stream through the routing control device.

10. The device of claim 8, wherein the switch discovery module is configured to forward, from the forwarding device, the control packet to another forwarding device on a remaining data link layer port of the forwarding device different from the data link layer port that the control packet was received on.

11. The device of claim 10, wherein the switch discovery module is configured to send a label to another forwarding device in the plurality of forwarding devices, wherein the label, when attached to a packet received at the forwarding device, indicates to the forwarding device to forward the packet toward the routing control device on the data link layer port identified by the switch discovery module.

12. The device of claim 10, wherein the control packet includes a serial number, and the forwarding device further comprises a performance metric module configured to:
determine whether the forwarding device has previously forwarded another control packet that is from the routing control device, has the serial number, and indicates another performance metric of routing a packet from the forwarding device to the routing control device better than the performance metric in the control packet, and
wherein the forwarding occurs when the path request module determines to have not previously forwarded the other control packet.

13. The device of claim 10, wherein the switch discovery module is further configured to:
send a message to the routing control device on the identified data link layer port, the message identifying the forwarding device and other forwarding devices in the plurality of forwarding devices that the forwarding device is connected to,
wherein the routing control device is configured to use the message to build a database representing a topology of the network and to use the database to determine the path.

14. The device of claim 10, wherein the control packet includes an identifier of the routing control device, and the switch discovery module is further configured to:
receive, on a data link layer port of the forwarding device, another control packet including an identifier of another routing control device;
identify, based at least in part on the data link layer port that received the other control packet, which data link layer port on the forwarding device to forward data to reach the other routing control device; and
in response to receipt of a new data stream at the forwarding device, determine which of the routing control device and the other routing control device to send the message instructing that the path be configured through the plurality of forwarding devices.

15. A program storage device tangibly embodying a program of instructions executable by at least one machine to perform a method for discovering routes from a plurality of forwarding devices to a routing control device, the method comprising:
(a) receiving, on a data link layer port of a forwarding device of the plurality of forwarding devices, a control packet originating from the routing control device, wherein the data link layer port connects the forwarding device to another forwarding device via a link, and the control packet includes a performance metric indicating an estimated time to route a packet from the other forwarding device to the routing control device;
(b) identifying, based at least in part on (i) the data link layer port that received the control packet and (ii) the performance metric in the control packet, which data link layer port, identified by a MAC address, on the forwarding device to forward data to reach the routing control device;
(c) in response to receipt of a new data stream at the forwarding device, sending a message to the routing control device on the data link layer port identified in (b), the message instructing the routing control device to determine a path through the plurality of forwarding devices to a destination and to configure a subset of the plurality of forwarding devices to forward the new data stream along the determined path; and
(d) forwarding the new data stream according to configuration commands of the routing control device.

16. The program storage device of claim 15, wherein the sending (c) comprises forwarding the initial packet of the new data stream through the control device.

17. The program storage device of claim 15, the method further comprising
(e) forwarding, from the forwarding device, the control packet to another forwarding device on a remaining data link layer port of the forwarding device different from the data link layer port that the packet was received on in (a).

18. The program storage device of claim 17, the method further comprising:
(f) at the forwarding device, sending a label to another forwarding device in the plurality of forwarding devices, wherein the label, when attached to a packet received at the forwarding device indicates to the forwarding device to forward the packet toward the routing control device on the data link layer port identified in (b).

19. The program storage device of claim 17, wherein the control packet includes a serial number, and the method further comprising:

(f) determining whether the forwarding device has previously forwarded another control packet that is from the routing control device, has the serial number, and indicates another estimated time to route a packet from the forwarding device to the routing control device lower than the estimated time in the control packet, and wherein the step forwarding (e) occurs when the forwarding device is determined to have not previously forwarded the other control packet in (f).

20. The program storage device of claim 15, further comprising:

(e) sending a message to the routing control device on the data link layer port identified in (b), the message identifying the forwarding device and other forwarding devices in the plurality of forwarding devices that the forwarding device is connected to, wherein the routing control device uses the message to build a database representing a topology of the network and uses the database to determine the path.

21. The program storage device of claim 15, wherein the control packet includes an identifier of the routing control device, and further comprising:

(e) receiving, on a data link layer port of the forwarding device, another control packet including an identifier of another routing control device;

(f) identifying, based at least in part on the data link layer port that received the forwarding device, which data link layer port on the forwarding device to forward data to reach the other routing control device; and (g) in response to receipt of a new data stream at the forwarding device, determining which of the routing control device and the other routing control device to send the message instructing that the path be configured through the plurality of forwarding devices.

* * * * *